United States Patent
Weng

(10) Patent No.: US 10,390,088 B2
(45) Date of Patent: Aug. 20, 2019

(54) COLLECTION AND PROCESSING METHOD FOR VIEWING INFORMATION OF VIDEOS AND DEVICE AND SERVER USING THE SAME

(71) Applicant: NANNING FUGUI PRECISION INDUSTRIAL CO., LTD., Nanning (CN)

(72) Inventor: Chih-Hung Weng, New Taipei (TW)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 0 days.

(21) Appl. No.: 16/174,737

(22) Filed: Oct. 30, 2018

(65) Prior Publication Data

US 2019/0069025 A1    Feb. 28, 2019

Related U.S. Application Data

(62) Division of application No. 15/408,366, filed on Jan. 17, 2017, now abandoned.

(51) Int. Cl.
| | |
|---|---|
| H04N 21/45 | (2011.01) |
| H04N 21/442 | (2011.01) |
| H04N 21/24 | (2011.01) |
| H04N 21/25 | (2011.01) |
| H04N 21/658 | (2011.01) |
| H04N 21/472 | (2011.01) |

(52) U.S. Cl.
CPC ..... *H04N 21/4532* (2013.01); *H04N 21/2407* (2013.01); *H04N 21/2408* (2013.01); *H04N 21/251* (2013.01); *H04N 21/252* (2013.01); *H04N 21/44204* (2013.01); *H04N 21/44213* (2013.01); *H04N 21/44222* (2013.01); *H04N 21/6582* (2013.01); *H04N 21/47217* (2013.01)

(58) Field of Classification Search
None
See application file for complete search history.

(56) References Cited

U.S. PATENT DOCUMENTS

| | | | | |
|---|---|---|---|---|
| 6,122,279 A | * | 9/2000 | Milway | H04L 49/203 370/395.32 |
| 8,429,243 B1 | * | 4/2013 | Wang | G06F 16/958 709/217 |

(Continued)

FOREIGN PATENT DOCUMENTS

CN    1720519 A    1/2006

*Primary Examiner* — Ricky Chin
(74) *Attorney, Agent, or Firm* — ScienBiziP, P.C.

(57) ABSTRACT

A collection method for information as to a user viewing videos can be executed in a device. The device comprises at least a decoder and at least one video application providing video content. The decoder decodes video contents. The device monitors pages of the video application and configures a table of browsing record for each of the pages. When it is monitored that a target page of the video application is opened and that the decoder is running, the device collects viewing information associated with the video content and records the viewing information in a table of target browsing record. On termination of the target page of the video application, the device transmits the table of target browsing record to a server. A processing method for viewing information, a device, and a server are also disclosed.

12 Claims, 7 Drawing Sheets

(56) References Cited

U.S. PATENT DOCUMENTS

| Patent/Pub No. | Date | Inventor | Classification |
|---|---|---|---|
| 8,706,675 B1* | 4/2014 | Samaniego | G06Q 30/0201 706/52 |
| 8,924,993 B1* | 12/2014 | Niebles Duque | G06K 9/00744 725/9 |
| 9,148,706 B1* | 9/2015 | Shin | H04N 21/812 |
| 9,369,740 B1* | 6/2016 | Funk | H04N 21/20 |
| 9,872,069 B1* | 1/2018 | Funk | H04N 21/442 |
| 9,921,632 B2* | 3/2018 | Mondal | G06F 1/32 |
| 2003/0023427 A1 | 1/2003 | Cassin et al. | |
| 2007/0033224 A1* | 2/2007 | Allen | G06F 16/954 |
| 2007/0050596 A1* | 3/2007 | Cooke | G06F 9/345 711/216 |
| 2007/0140482 A1* | 6/2007 | Ploog | G06F 21/85 380/44 |
| 2008/0222283 A1* | 9/2008 | Ertugrul | G06Q 30/02 709/224 |
| 2010/0262751 A1* | 10/2010 | Avudaiyappan | G06F 12/0292 711/5 |
| 2011/0055489 A1* | 3/2011 | Reddy | G06F 12/0831 711/141 |
| 2011/0142047 A1* | 6/2011 | Choi | H04L 45/742 370/392 |
| 2011/0161951 A1* | 6/2011 | Anderson | H04L 41/0253 717/172 |
| 2012/0023084 A1* | 1/2012 | Lalji | G06F 16/951 707/706 |
| 2012/0204201 A1* | 8/2012 | Cassidy | H04N 21/258 725/10 |
| 2013/0104024 A1* | 4/2013 | Rajkumar | G06F 16/70 715/234 |
| 2013/0132833 A1* | 5/2013 | White | G06F 3/048 715/704 |
| 2014/0157209 A1* | 6/2014 | Dalal | G06F 3/017 715/863 |
| 2014/0244834 A1 | 8/2014 | Guedalia | |
| 2014/0281913 A1* | 9/2014 | Saeta | H04L 67/22 715/234 |
| 2014/0289241 A1* | 9/2014 | Anderson | G06F 16/48 707/736 |
| 2016/0019194 A1* | 1/2016 | Mondal | G06F 1/32 715/234 |
| 2016/0196345 A1* | 7/2016 | Kreifeldt | H04L 65/60 707/738 |
| 2017/0034578 A1* | 2/2017 | Patel | H04N 21/454 |
| 2017/0139802 A1* | 5/2017 | Hajiyev | G06F 11/3476 |
| 2017/0220216 A1* | 8/2017 | Thompson | G06F 3/0483 |
| 2017/0294134 A1* | 10/2017 | Angel | G09B 5/065 |
| 2017/0308246 A1* | 10/2017 | DeLuca | G06F 16/24578 |
| 2017/0318339 A1* | 11/2017 | Fichter | H04N 21/44204 |

* cited by examiner

COLLECTION AND PROCESSING METHOD FOR VIEWING INFORMATION OF VIDEOS AND DEVICE AND SERVER USING THE SAME

CROSS-REFERENCE TO RELATED APPLICATIONS

This application is a divisional of U.S. application Ser. No. 15/408,366, entitled "COLLECTION AND PROCESSING METHOD FOR INFORMATION AS TO VIEWING OF VIDEOS BY USER AND DEVICE AND SERVER USING THE SAME", filed on Jan. 17, 2017, published as US Patent Application Publication No. 2018-0205994. The entirety of each of the above-mentioned patent applications is hereby incorporated by reference herein in its entirety.

FIELD

The subject matter herein generally relates to entertainment, and particularly relates to a collection and processing method for viewing information.

BACKGROUND

Multimedia contents from networks can be obtained on TVs via third-party applications, such as iQIYI, Tencent video, Youku, Netflix, and Skype. The third-party applications, which are pre-installed independently on an operating system (e.g., Android system or IOS system) of a device, do not provide the device with usage data recorded by the third-party applications. In other words, the device cannot obtain usage data from the third-party applications.

Therefore, devices do not have the capability of collecting usage information and there is room for improvement.

BRIEF DESCRIPTION OF THE DRAWINGS

Implementations of the present technology will now be described, by way of embodiments only, with reference to the attached figures.

DETAILED DESCRIPTION

Figure 1:
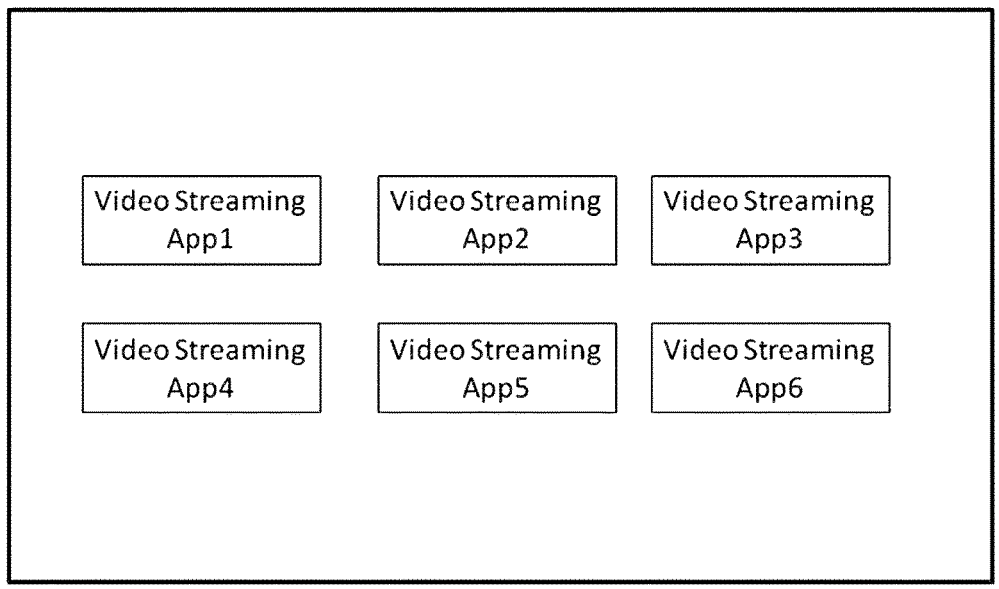
FIG. 1 is a diagrammatic view of an embodiment of a display interface of a device installed with multiple video applications.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

It should be noted that references to "an" or "one" exemplary embodiment in this disclosure are not necessarily to the same exemplary embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when used, means "including, but not necessarily limited to"; it specifically indicates open-ended inclusion or membership in a so-described combination, group, series, and the like.

FIG. 1 shows a display interface of a device output. The device may be any device with an Over The Top (OTT) function. A set top box (STB) is used in the embodiments disclosed in the present specification. The STB has multiple independently-installed video applications (VAPPs), such as VAPP 1 of a company A and VAPP 2 of a company B. For example, the company A can set the VAPP 1 to prohibit the STB from obtaining usage information recorded by the VAPP 1, such as a name of the video played, start time of watching, and duration of the playback.

Figure 2:
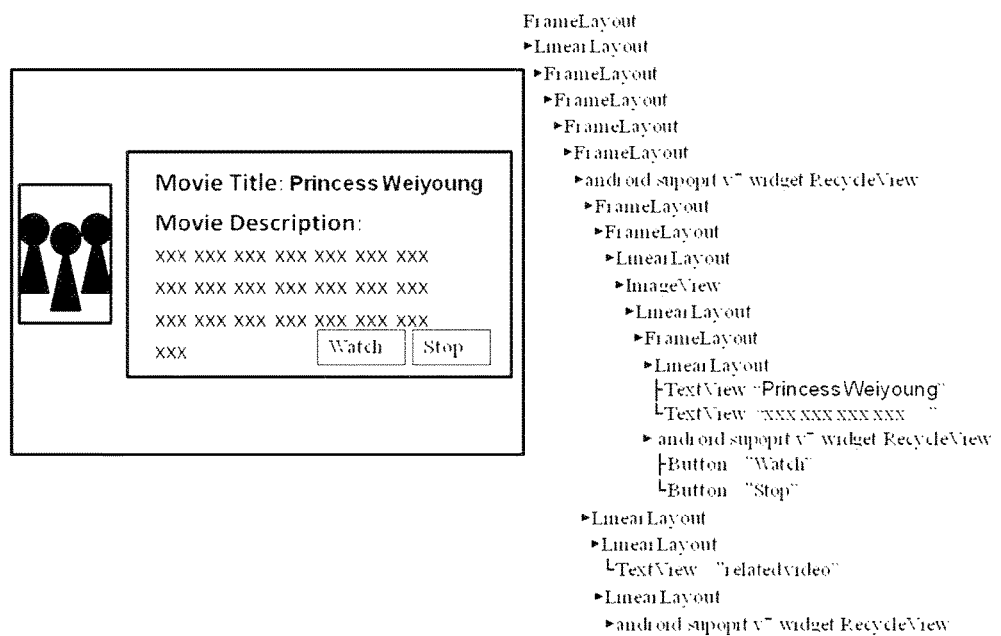
FIG. 2 is a diagrammatic view of an embodiment of a tree structure with a system level of a page and a plurality of text nodes distributed in the tree structure.

When a VAPP is clicked to launch, the STB collects a tree structure with a system level of a page and a plurality of text nodes distributed in the tree structure. The tree structure with the system level of the page refers to the tree structure of the page in VAPP installed in the STB. Referring to FIG. 2, the tree structure of the VAPP and the plurality of text nodes distributed in the tree structure presents a data stream generated by the video being played or available for playback via the VAPP. For example, in FIG. 2, the name of the video is "Princess Weiyoung" located in a fourth "Linear-Layout" node of the tree structure, the first text message of the fourth node. An embodiment of the present disclosure extracts viewing information by looking for a position of the text node of the video-related information in the VAPP.

Figure 3:
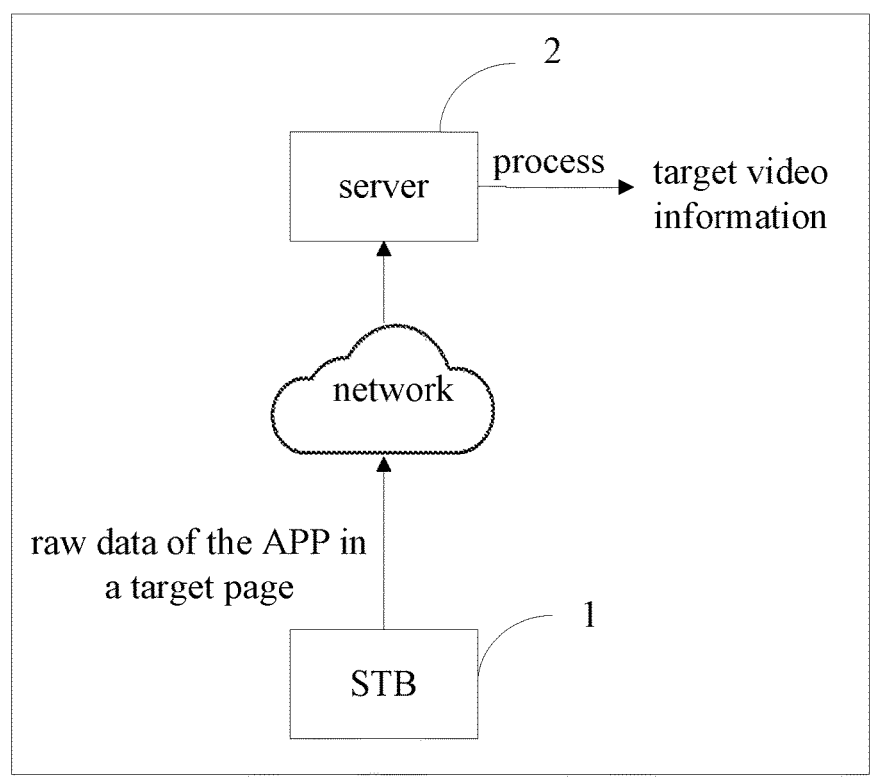
FIG. 3 is a structural view of an embodiment of a viewing information collection and processing system.

FIG. 3 shows a collection and processing system to collect and process viewing information. The collection and processing system includes an STB 1 and a server 2. The STB 1 collects raw data of a plurality of pages before a video is viewed. The STB 1 uploads to the server the raw data of the VAPP in a target page, including a version number, an identification number, and page information. Then the server processes the version number, the identification number, and the page information, and finds target viewing information from the target page according to a playback state of the video. The target viewing information includes a name of the video played by the video play page, start time of viewing, and duration of the playback.

Figure 4:
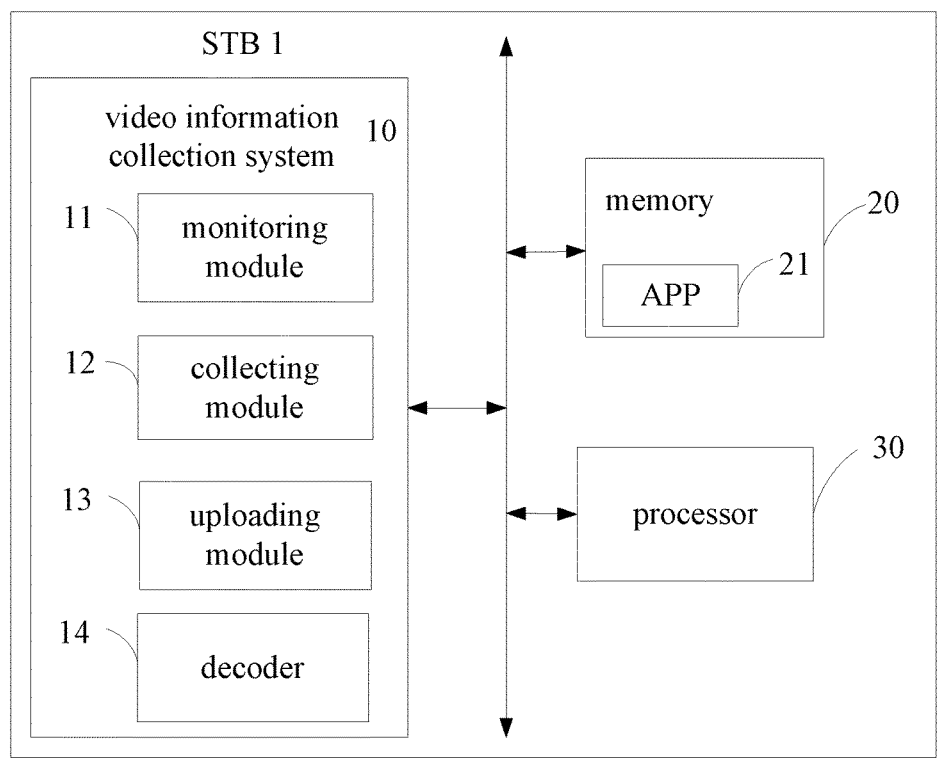
FIG. 4 is a block diagram of an embodiment of functional modules of a Set Top Box (STB) shown in FIG. 1.

FIG. 4 shows functional modules of the STB 1 shown in FIG. 1. The STB 1 comprises a decoder 14 and a VAPP 21. The decoder 14 is adapted to decode video contents of the VAPP 21. The STB 1 includes a viewing information collection system 10, a memory 20, and a processor 30. The viewing information collection system 10 includes a monitoring module 11, a collecting module 12, an uploading module 13, and the decoder 14. The monitoring modules 11, the collecting module 12, the uploading module 13, and the decoder 14 are executed by one or more of the processors 30. Each of the modules 11-14 of the present disclosure is a computer program or segment of a program for completing a specific function. A memory 20 stores a program code and other information of the viewing information collection system 10 and VAPP 21.

The monitoring module 11 monitors pages of the VAPP and compiles a table of browsing record for each of the pages, wherein the table comprises a tree structure with a system level of a page and a plurality of text nodes distributed in the tree structure associated with one corresponding page.

To view VAPP1 in STB 1, for example, the VAPP 1 is clicked to enter a first page of the VAPP 1 through a remote control. When the confirmation key is pressed in one of the areas of the first page, the monitoring module 11 records and saves a first tree structure and a plurality of text nodes distributed in the first tree structure. The recording and saving are of a table of a first browsing record of the first page. When the confirmation key is pressed in one other of the areas of the first page, the VAPP 1 enters a second page. The monitoring module 11 continues to record and save a second tree structure and a plurality of text nodes distributed in the second tree structure in a table of a second browsing record of the second page. Accordingly, each time the confirmation key is pressed in a page, the VAPP 1 opens a next page. The monitoring module 11 monitors the next page and compiles a corresponding table of browsing record to record the tree structure and a plurality of text nodes distributed in the tree structure.

When the target page of the VAPP 1 is terminated, the collecting module 12 starts to collect viewing information associated with the video content being played by the VAPP 1, and records the viewing information in a table of target browsing record corresponding to the target page. In the embodiment disclosed herein, the target page refers to a video playback page. The table of target browsing record comprises a tree structure with a system level of the target page and a plurality of text nodes distributed in the tree structure.

In one embodiment, the table of target browsing record is further adapted to recording playback state information of the target page. A running state of the decoder 14 corresponds to the playback state of the video. When the decoder 14 is in a playback state, the video is in a playback or a resume playback state; when the decoder 14 is in a pausing state, the video is also paused; when the decoder 14 is a stopped state, the video is stopped.

When the target page is entered, the monitoring module 11 monitors the running state of the decoder 14, and analyzes the playback state information of the target page. After that the monitoring and the analyzing, the monitoring module 11 collects viewing information associated with the video content being played by the VAPP and records the playback state information in the table of target browsing record so that the collecting module 12 collects the start playback time and the duration of the playback. The running state being monitored includes playback, resume playback, pausing, and/or stopping.

The uploading module 13 uploads the table of target browsing record to a server when the monitored target page of the VAPP 1 is terminated. This causes the server to extract and analyze viewing information associated with the video content being played by VAPP 1 according to the table of target browsing record.

When the VAPP 1 is on the target page, the information of the page is updated at preset times. The state of the video may be in playback, resume playback, pausing, and/or stopping. When the target page is terminated, the STB 1 generates a table of target browsing record corresponding to the target page and the table of target browsing record records the target viewing information. The target viewing information comprises a name of the video being played by the target page, start time of playing the video, and playback duration.

When the decoder 14 is in the playback state, the video is in the playback state, the name of the video is shown in the text node of the tree structure of the table of target browsing record.

In one embodiment, the table of the browsing record further includes the version, the identification number, and a user account of the VAPP 1. Depending on the version, the VAPP 1 may be different in typesetting so that the tree structure with the system level of the page and the plurality of text nodes distributed in the tree structure may be different in type. The identification number is used to identify the type of the VAPP. For example, the identification number can determine whether the VAPP is VAPP 1, VAPP 2, or VAPP 3. The user account identifies the STB 1 and collects the viewing information monitored by the STB 1 corresponding to the user account.

Figure 5:
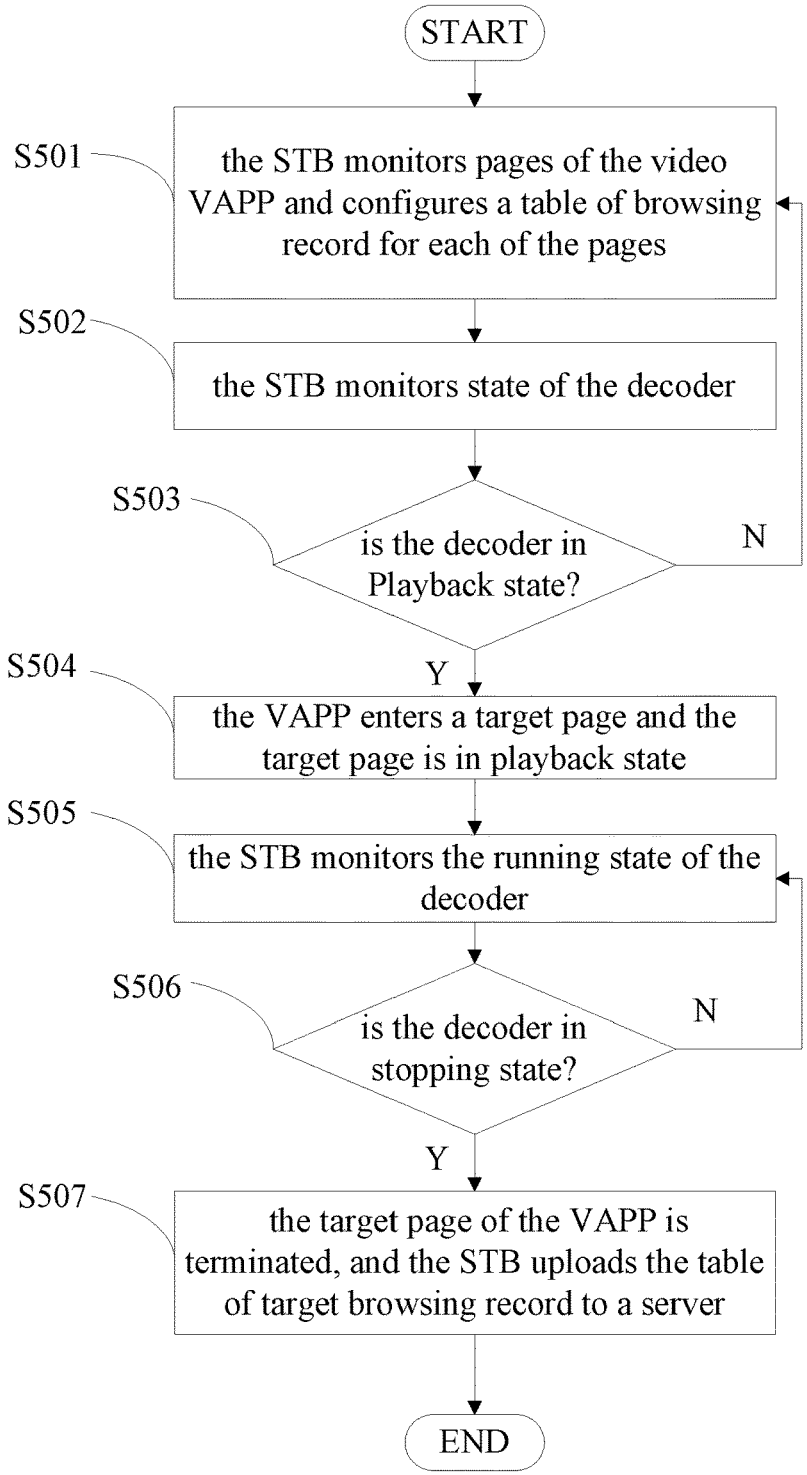
FIG. 5 is a flowchart of an embodiment of the collection method for viewing information.

FIG. 5 is a flowchart of an embodiment of the collection method for viewing information. The implementation subject of the method can be an STB. The STB includes at least one decoder and at least one VAPP, the decoder is used for decoding video content of encoded videos.

At block 501, the STB monitors pages of the video VAPP and compiles a table of browsing record for each of the pages, wherein the table of browsing record includes a tree structure with a system level of a page and a plurality of text nodes distributed in the tree structure associated with one corresponding page.

At block 502, the STB monitors state of the decoder. The state being monitored of the decoder includes playback, resume playback, pausing, and/or stopping.

At block 503, the STB determines whether the decoder is in playback state. If the decoder is in the playback state, block 504 is executed; otherwise returns to execute block 502.

At block 504, the VAPP enters a target page and the target page is in playback state.

At block 505, the STB monitors the state of the decoder.

At block 506, the STB determines whether the decoder is in stopping state. If the decoder is in the stopping state, block 507 is executed; otherwise block 505 is executed.

At block 507, the target page of the VAPP is terminated, and the STB uploads the table of target browsing record to a server for extracting and analyzing target viewing information from the table of target browsing record.

Figure 6:
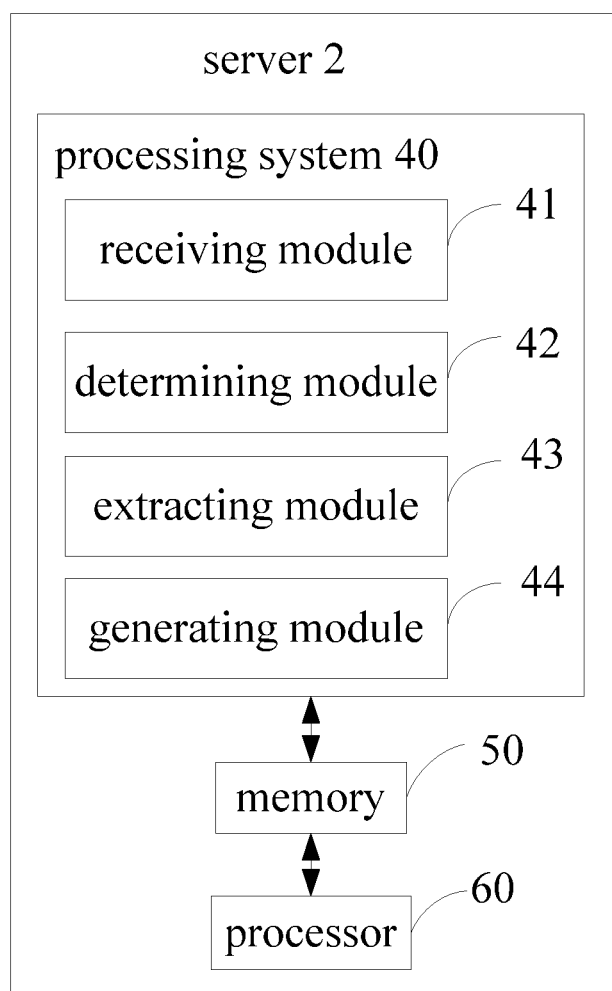
FIG. 6 is a block diagram of an embodiment of functional modules of a server in the system of FIG. 3.

FIG. 6 is a block diagram of an embodiment of functional modules of a server. Server 2 processes a plurality of tables of browsing record collected from a plurality of VAPPs by a STB, wherein each of the tables of the browsing record records a tree structure with a system level of a page opened through the VAPP and a plurality of text nodes distributed in the tree structure. The server 2 includes a processing system 40, a memory 50, and a processor 60. The processing system 40 includes a receiving module 41, a determining module 42, an extracting module 43, and a generating module 44. The modules 41-44 are executed by one or more of the processors 60. Each of the modules 41-44 of the present disclosure is a computer program or segment of a program for completing a specific function. A memory 50 stores the program code and other information of the processing system 40.

The receiving module 41 receives a table of target browsing record from the STB. The table of target browsing record records a tree structure with a system level of the page opened through the VAPP and a plurality of text nodes distributed in the tree structure. In one embodiment, the table of target browsing record further comprises at least a version number, an identification number and a user account of the VAPP. The target page refers to a video playback page.

In one embodiment, the version number of the VAPP is used to determine the page layout of the VAPP, so that a tree structure with the system level of the page of the VAPP 1 is determined. For example, VAPP 1 with version 5.10.2 and VAPP 1 with version 5.10.1 may have a same type of VAPP, but different versions. Layout of the same page of the two versions may are different, the tree structures with the system level of the video pages are also different.

The identification number determines the type of the VAPP. For example, the kind of the VAPP can be determined according to the identification number, such as VAPP 1, VAPP 2, and VAPP 3. The user account determines which the STB is and collects the viewing information monitored by the STB corresponding to the user account.

The determining module 42 determines whether the table of target browsing record corresponds to a video playback page according to the table of target browsing record. The table of target browsing record records the playback state information of the target page, and whether the target page is in video playback state can be known according to the playback state information of the target page, thereby whether the target page is a video playback page can be determined.

The extracting module 43 extracts target viewing information from the table of target browsing record when the table of target browsing record corresponds to the video playback page.

In one embodiment, when the table of target browsing record corresponds to the video playback page, the extracting module 43 determines whether the tree structure in the table of target browsing record coincides with a preset tree structure. When the tree structure in the table of target browsing record coincides with the preset tree structure, the extracting module 43 selects a filter corresponding to the preset tree structure to extract the target viewing information from the table of target browsing record. The filter is used to filter text node at corresponding position in the table of target browsing record according to the position of the preset tree structure viewing information to extract the target viewing information from the text node. The target viewing information includes the name of the video played, start time of watching, and duration of the playback.

Specifically, different versions of VAPP pages have different tree structures, so the corresponding filters are also different. For example, the filter corresponding to pages of the VAPP 1 in version 5.10.2 is different from the filter corresponding to pages of VAPP 1 in version 5.10.1. Similarly, pages of different identification numbers of the VAPPs have different tree structures. For example, VAPP 1 and VAPP 2, the layout of the two pages are different, so the tree structures of the two pages are different. Therefore, it is necessary to select the filter corresponding to the same version and the same identification number of VAPP to filter out the viewing information from the received table of browsing record. The determining module 43 determines the type and the version of the VAPP according to the received table of target browsing record, and determines the tree structure to find a right filter.

In one embodiment, when the extracting module 43 extracts the name of the video from the text node, the target viewing information is stored to enable the company to purchase popular videos, to reduce the cost of purchasing the video content. On the other hand, it recommends the relevant video to a viewed and provides a better viewing experience.

In one embodiment, when the tree structure in the table of target browsing record does not coincide with the preset tree structure, the extracting module 43 extracts a plurality of text messages from the multiple text nodes. Then the extracting module 43 compares the respective text message with the viewing information in a video library one by one. When the target text message of the plurality of text messages coincides with the viewing information in the video library, the extracting module 43 takes the target text message as the target viewing information.

The generating module 44 generates a filter according to the position of the text node at which the target text message is located in the table of target browsing record, and automatically extracts viewing information in the other table of browsing record with the same tree structure as the table of target browsing record.

In one embodiment, when the tree structure in the table of target browsing record does not coincide with the preset tree structure. For example, the latest version 5.10.2 of VAPP 1 is selected to watch the video, the server 2 does not find a preset tree structure in accordance with the tree structure in the table of target browsing record. The text message is compared with the viewing information in the video library one by one to find out a location of the text node in the table of target browsing record where the viewing information is located. The generating module 44 generates a filter corresponding to the tree structure according to the position of the text node at which the target text message is located. If the tree structure in the table of target browsing record is determined to coincide with the preset tree structure in the next viewing of the video, the filter is directly selected to extract the target viewing information.

In one embodiment, after the server 2 extracts and stores the viewing information, all of the received tables of browsing record are deleted to save the server resources.

Figure 7:
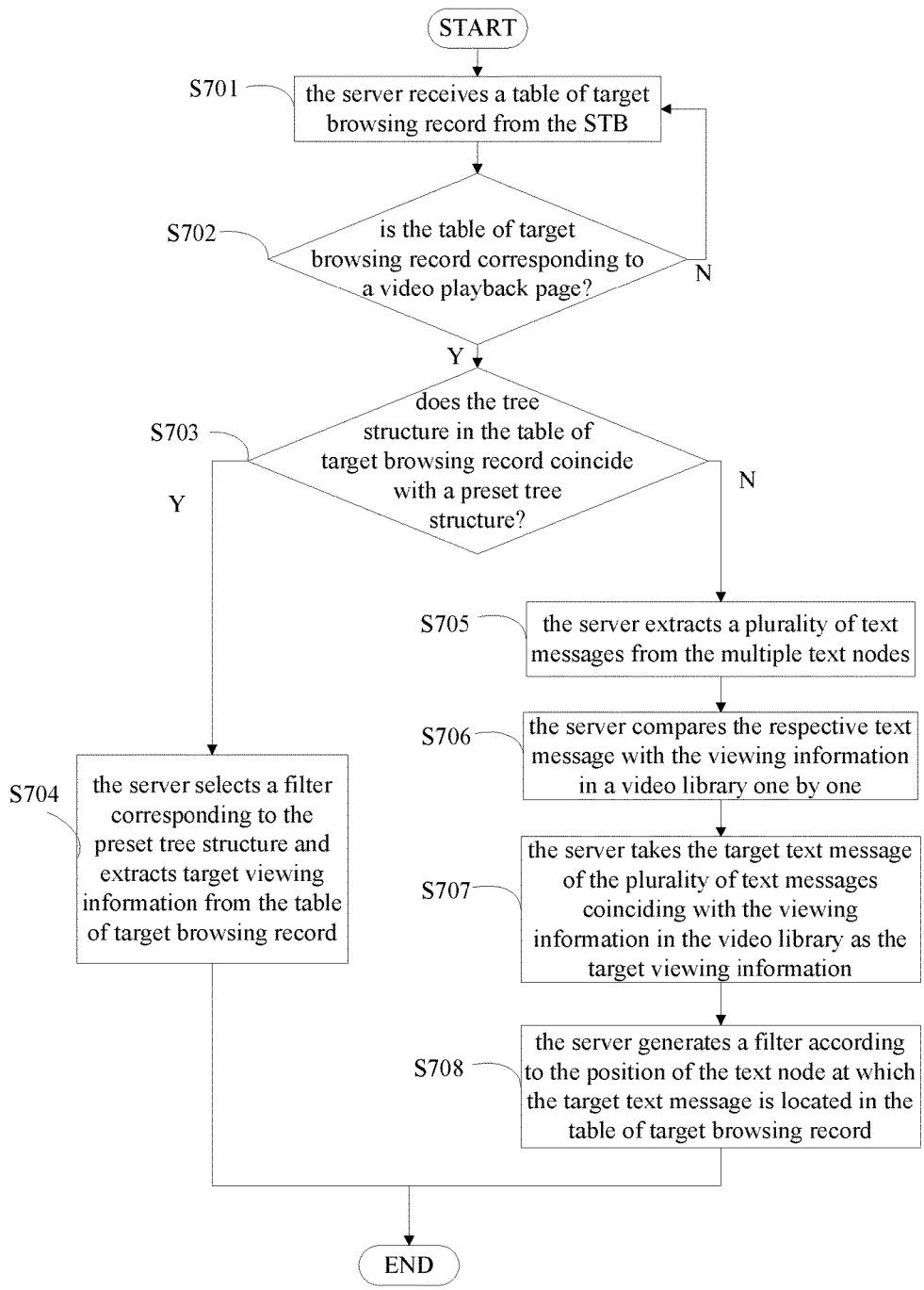
FIG. 7 is a flowchart of an embodiment of a processing method for viewing information.

FIG. 7 is a flowchart of an embodiment of a viewing information processing method. The implementation subject of the method can be a server. The server processes a plurality of tables of browsing record collected from a plurality of VAPPs by a STB. Each of the tables of browsing record records a tree structure with a system level of a page opened through the VAPP at and a plurality of text nodes distributed in the tree structure.

At block 701, the server receives a table of target browsing record from the STB.

At block 702, the server determines whether the table of target browsing record corresponds to a video playback page according to the table of target browsing record. If the table of target browsing record corresponds to the video playback page, block 703 is executed; otherwise the block 701 returns to be executed.

At block 703, the server determines whether the tree structure in the table of target browsing record coincides with a preset tree structure. When the tree structure in the table of target browsing record coincides with a preset tree structure, block 704 is executed; otherwise the block 705 is executed.

At block 704, the server selects a filter corresponding to the preset tree structure and extracts target viewing information from the table of target browsing record.

At block 705, the server extracts a plurality of text messages from the multiple text nodes.

At block 706, the server compares the respective text message with the viewing information in a video library one by one.

At block 707, the server takes the target text message of the plurality of text messages coinciding with the viewing information in the video library as the target viewing information.

At block 708, the server generates a filter according to the position of the text node at which the target text message is located in the table of target browsing record, so as to automatically extract viewing information in the other table of browsing record with the same tree structure as the table of target browsing record.

The viewing information collection and processing method, a set top box and a server, which can collect browsing records in the plurality of independent video application programs and extract the viewing information so as to recommend the related video to the viewer. The viewing information collection and processing method as disclosed can effectively increase the competitiveness of the set top box product and at the same time improve the viewing experience to a great extent.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A processing method for viewing information operable to be executed in a server, wherein the server is adapted for processing a plurality of tables of browsing record collected from a plurality of video applications (VAPPs) by a device, the method comprising:
   receiving a table of target browsing record from the device, wherein the table of target browsing record records a tree structure with a system level of the page opened through the VAPP and a plurality of text nodes distributed in the tree structure;
   determining whether the table of target browsing record corresponds to a video playback page according to the table of target browsing record;
   when the table of target browsing record corresponds to the video playback page, extracting target viewing information from the table of target browsing record;
   wherein the extracting of the table of target browsing record further comprises:
   determining whether the tree structure in the table of target browsing record coincides with a preset tree structure; and when the tree structure in the table of target browsing record coincides with the preset tree structure, selecting a filter corresponding to the preset tree structure and extracting the target viewing information from the table of target browsing record; and
   when tree structure in the table of target browsing record does not coincide with the preset tree structure, extracting a plurality of text messages from the multiple text nodes; comparing the respective text message with the viewing information in a video library one by one; and taking the target text message of the plurality of text messages coinciding with the viewing information in the video library as the target viewing information.

2. The processing method for viewing information of claim 1, wherein the table of target browsing record further comprises at least a version number, an identification number and a user account of the VAPP.

3. The processing method for viewing information of claim 1, further comprising selecting a text node at a corresponding position in the table of target browsing record by the filter, and extracting the target viewing information from the text node by the filter according to a position of viewing information in the preset tree structure.

4. The processing method for viewing information of claim 1, wherein taking the target text message as the target viewing information further comprises: generating the filter according to the position of the text node at which the target text message is located in the table of target browsing record, so as to automatically extract viewing information in the other table of browsing record with the same tree structure as the table of target browsing record.

5. The processing method for viewing information of claim 1, wherein the target viewing information includes a name of the video played, start time of watching, and duration of the playback.

6. The processing method for viewing information of claim 1, wherein playback states of the target viewing information comprise playback state, resume playback state, pausing state, and/or stopping state.

7. A server, wherein the server is adapted for processing a plurality of tables of browsing record collected from a plurality of video applications (VAPPs) by a device, comprising:
   at least one processor;
   a non-transitory storage system coupled to the at least one processor and adapted to store one or more programs to be executed by the at least one processor, the one or more programs comprising instructions for:
   receiving a table of target browsing record from the device, wherein the table of target browsing record records a tree structure with a system level of the page opened through the VAPP and a plurality of text nodes distributed in the tree structure;
   determining whether the table of target browsing record corresponds to a video playback page according to the table of target browsing record;
   when the table of target browsing record corresponds to the video playback page, extracting target viewing information from the table of target browsing record;
   wherein the server further comprises:
   determining whether the tree structure in the table of target browsing record coincides with a preset tree structure; and when the tree structure in the table of target browsing record coincides with the preset tree structure, selecting a filter corresponding to the preset tree structure and extracting the target viewing information from the table of target browsing record; and when the tree structure in the table target browsing record does not coincide with the preset structure, extracting a plurality of text messages from the multiple text nodes; comparing the respective text message with the viewing information in a video library one by one; and taking the target text message of the plurality of text messages coinciding with the viewing information in the video library as the target viewing information.

8. The server of claim 7, wherein the table of target browsing record further comprises at least a version number, an identification number and a user account of the VAPP.

9. The server of claim 7, wherein the filter selects a text node at a corresponding position in the table of target browsing record, according to a position of viewing information in the preset tree structure, to extract the target viewing information from the text node.

10. The server of claim 7, wherein the server further comprises: generating a filter according to the position of the text node at which the target text message is located in the table of target browsing record, so as to automatically extract viewing information in the other table of browsing record with the same tree structure as the table of target browsing record.

11. The server of claim 7, wherein the target viewing information includes a name of the video played, start time of watching, and duration of the playback.

12. The server of claim 7, wherein the playback state of the target viewing information includes playback, resume playback, pausing, and/or stopping.

* * * * *